United States Patent [19]
Hayen

[11] Patent Number: 5,579,402
[45] Date of Patent: Nov. 26, 1996

[54] METHOD FOR CONSTRUCTING A HISTOGRAM IN DIGITAL IMAGE PROCESSING BY STATISTICAL PIXEL SAMPLING

[75] Inventor: Lucien Hayen, Antwerpen, Belgium

[73] Assignee: AGFA-Gevaert, Mortsel, Belgium

[21] Appl. No.: 457,322

[22] Filed: Jun. 1, 1995

Related U.S. Application Data

[63] Continuation of Ser. No. 973,427, Nov. 9, 1992, abandoned.

[30] Foreign Application Priority Data

Nov. 14, 1991 [EP] European Pat. Off. ............ 91202952

[51] Int. Cl.$^6$ ................................................ G06K 9/00
[52] U.S. Cl. ........................................ 382/132; 382/133
[58] Field of Search .................................. 382/128, 132, 382/133, 171, 172, 192, 168, 224, 225, 228; 364/413.13; 250/327.2, 484.1

[56] References Cited

U.S. PATENT DOCUMENTS

| | | | |
|---|---|---|---|
| 4,887,305 | 12/1989 | Shimura | 382/18 |
| 4,903,310 | 2/1990 | Takeo | 382/6 |
| 4,950,894 | 8/1990 | Hara et al. | 382/18 |
| 5,067,163 | 11/1991 | Adachi | 382/6 |

Primary Examiner—Yon J. Couso
Attorney, Agent, or Firm—Richard J. Birch

[57] ABSTRACT

A method of creating a histogram of an image signal matrix, representative of a radiographic image obtained by scanning a stimulable phosphor sheet carrying a radiation image with stimulating rays, detecting the light emitted after stimulation and converting the detected light into electrical image signals, is described wherein the histogram is created by capturing only a fraction of the image pixels comprised in the image signal matrix, this fraction being determined on the basis of statical pixel sampling.

5 Claims, 6 Drawing Sheets

METHOD FOR CONSTRUCTING A HISTOGRAM IN DIGITAL IMAGE PROCESSING BY STATISTICAL PIXEL SAMPLING

This is a continuation of application Ser. No. 07/973,427 filed on Nov. 9, 1992, now abandoned.

DESCRIPTION

1. Field of the Invention

The present invention relates to the field of digital image processing, more particularly to a method for creating an amplitude histogram derived from reading-out a stimulable phosphor sheet carrying a radiation image stored thereon.

2. Background of the Invention

In radiography the interior of objects is reproduced by means of penetrating radiation, which is high energy radiation belonging to the class of X-rays, gamma-rays and high-energy elementary particle radiation, e.g. beta-rays, electron beam or neutron radiation. For the conversion of penetrating radiation into visible light and/or ultraviolet radiation luminescent substances, called phosphors, are used.

In a conventional radiographic system an X-ray radiograph is obtained as follows. X-rays transmitted image-wise through an object are converted in a so-called intensifying screen wherein phosphor particles absorb the transmitted X-rays into visible light and/or ultraviolet radiation of corresponding intensity to which a photographic film is more sensitive than to the direct impact of X-rays.

In practice the light emitted image-wise by said screen irradiates a contacting photographic silver halide emulsion layer film which after exposure is developed to form thereon a silver image in conformity with the X-ray image.

More recently an X-ray recording system has been developed wherein photostimulable storage phosphors are used having in addition to their immediate light emission on X-ray irradiation the property to store temporarily a large part of the energy of the X-ray image which energy is set free by photostimulation in the form of light different in wavelength characteristic from the light used in the photostimulation. In said X-ray recording system the light emitted on photostimulation is detected photoelectronically and transformed into sequential electrical signals. The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube. For instant diagnostic purposes, the reproduction is viewed and analysed on a suitable lightbox.

In digital radiography it is usual to adjust the radiation image read-out condition of such stimulable phosphor sheet by determining a so-called histogram. This histogram represents the distribution of intensities or grey levels within the image, resulting in a graphical plot of the percentage of image pixels at each digital intensity value or within a predetermined class-width of a scaling algorithm. The basic concept consists in assigning a large number of gradation levels to an exposure range in which a number of pixels is concentrated in order to guarantee sufficient discrimination of fine differences in density. The term "density" is used here to indicate an optical density level on an output material, or an electrical signal level of an image signal matrix (whether before, during or after the image processing steps).

In the beginning digital radiography did apply a preliminary read out of the radiation image, followed by adjusting the final read-out conditions of the radiation image. However, more recently one uses the histogram to identify the diagnostically important window and to map the read out image values onto the total density range of the available film. However, the histogram may be used as a basis on which other decisions can be made. For multispectral imagery, the histogram of each compound image or colour selection has to be calculated and displayed.

For sake of simplicity, we further refer in this application to a pixel-amplitude histogram in a monochrome image.

Because of the extremely high number of image pixels contained in the raw radiographic image resulting from scanning the total image plate, normally some millions of pixels, the recalculating time of the original "raw data" captured from the scanner to "histogram data" displayed on a viewing monitor is very time-consuming. The time required to set up a histogram of the pixel value data contained in the original raw image is quite high. As a consequence, the radiologist has to wait too long before he views a histogram on the display of a monitor.

OBJECTS OF THE INVENTION

It is an object of the present invention to provide a method of increasing the acquisition speed of the histogram, while maintaining the diagnostic reliability, of an image signal matrix, in particular a radiographic image signal matrix.

Another object is to provide an image processing method based on such histogram.

Further objects and advantages will become apparent from the following description with reference to the accompanying drawings.

SUMMARY OF THE INVENTION

We now have found that the above objects for creating a histogram of an image signal matrix, representative of a radiographic image obtained by scanning a stimulable phosphor sheet carrying a radiation image with stimulating rays, detecting the light emitted after stimulation and converting the detected light into electrical image signals, can be achieved by creating a histogram of an image signal matrix by means of only a fraction of the image pixels comprised in the image signal matrix, said fraction being determined on the basis of statistical pixel sampling. Further preferred embodiments of the present invention are set forth in the detailed description given hereinafter.

BRIEF DESCRIPTION OF THE DRAWINGS

Particular aspects of the present invention will be explained hereinbelow with reference to the drawings, in which.

DETAILED DESCRIPTION OF THE INVENTION

For a clear understanding of the present invention, we set forth some definitions further used in the description.

The term "statistical pixel sampling" means a selective part or fraction of numerical data relating to pixel values e.g. intensities, voltages, densities and others and includes random or stochastic sampling as well as deterministic sampling. In the case of statistical random pixel sampling the random generator creates random pixel-coordinates followed by reading out the pixel-densities and putting them in a histogram-processor. This delivers a mathematically more representative sample out of the pixel-values, but it requires the extra cost of the random generator and extra calculating time of such random generator.

The term "histogram" means the distribution of pixel values, in particular intensities, or grey levels or any other operation thereupon, within the original object image signal matrix. Such distribution may be represented in the form of a graphical plot of the percentage of image pixels at each digital intensity value or within a predetermined class-width of a scaling algorithm. A histogram mostly is a representation of the individual frequencies of occurrence of said pixel values, in which case it is called an "amplitude histogram". It may also be a representation of the accumulated frequencies of occurrence, in which case it is called a "cumulative histogram". The term "threshold histogram" means a histogram wherein only pixel-values satisfying some predetermined threshold values are represented. If in case of a discretely sampled image, the differences between successive image values are calculated and plot in a statistical histogram, this is called a "difference histograms". The present invention relates to any of these histograms, in particular to amplitude histograms.

Figure 1:
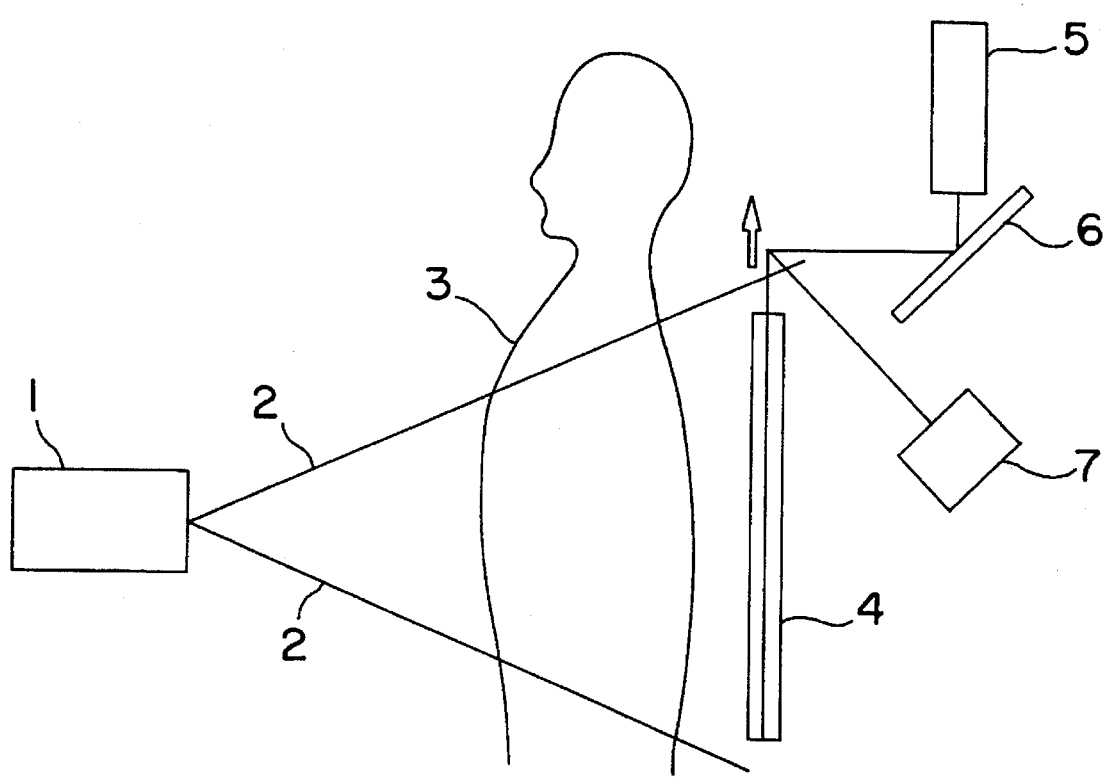
FIG. 1 represents a cross-sectional schematic drawing of an apparatus for recording and reading-out of an image produced by ionizing radiation.

In FIG. 1 element 1 is an X-ray exposure source emitting X-rays 2 modulated by the internal structure of a person 3 to be radiographed. The modulated X-ray beam strikes the recording material 4, wherein a latent image is formed. The photostimulation of this latent image proceeds with a laser beam emitted by the laser device 5. A light deflector 6, formed by a galvanometer mirror, deflects the laser beam so that it strikes the sheet 4 in linewise scanning fashion. The automatic and accurate handling of such sheets 4 in order to get scanned is described in EP 0-334-136-A2. A photoelectronic detector 7, e.g. photomultiplier tube, receives the fluorescent light which is separated from the stimulating light by a cut-off filter, not shown in the drawing, and converts it into an electrical image representation, hereinafter referred to as radiographic image signal matrix.

Figure 2:
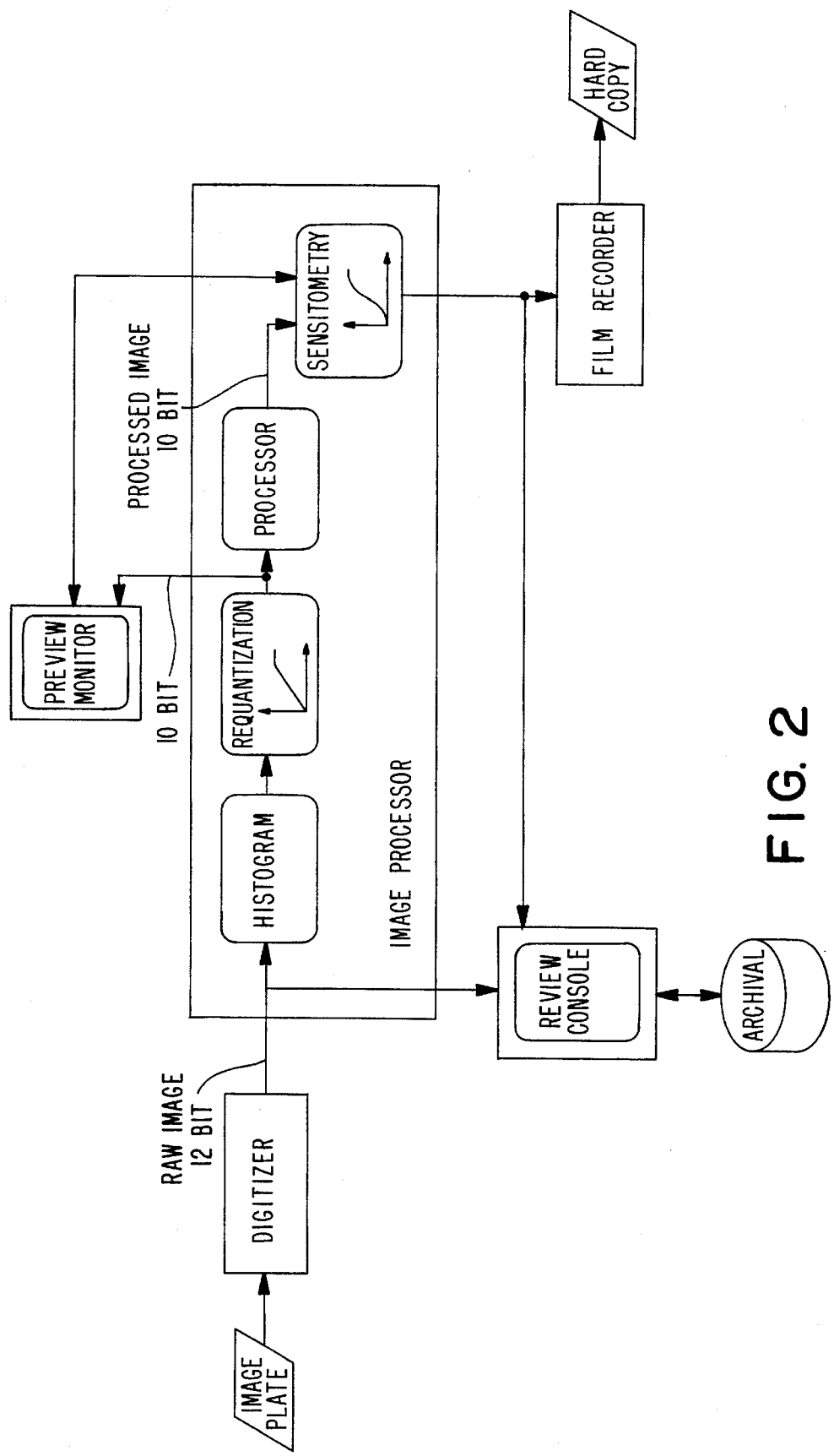
FIG. 2 is a principal overview of the image-data flow within a computerised diagnostic system according.

This digital image, called "raw" image, being a 12 bit image, is sent to the image processor and is converted into a logarithmic quantity, as depicted in FIG. 2. The latitude of this logarithmised raw image, about 2.7 decades, is too large to be printed on film or displayed on a monitor. The actual object latitude within an image plate is limited to 1.5 decades; for most acquisitions it is even lower. The remaining 1.2 decades of dynamic range of the digitizing system establishes a safe margin for under- or overexposure. The actual object exposure level and latitude have to be determined for each acquired image in order to confine the effective range of the digital image to the diagnostically relevant window. The process of confining the dynamic range to the diagnostically useful window, called requantisation, returns a 10 bit image, representing an image proportional to log Exposure, where the grey levels below and above the diagnostic window have been clipped.

At this stage the image is transmitted to a first or preview monitor which gives a first impression of the acquired image and hence will provide for early feedback to the operator in case the acquisition went wrong. Log Exposure values are then mapped to density values corresponding with a desired sensitometry. Said processed image signals are transmitted to and displayed on the final review console, stored on hard disc and are applied to a digital to analogue convertor, the output of which controls the modulator of a laser recorder for making a hard copy on a photographic film.

Figure 3:
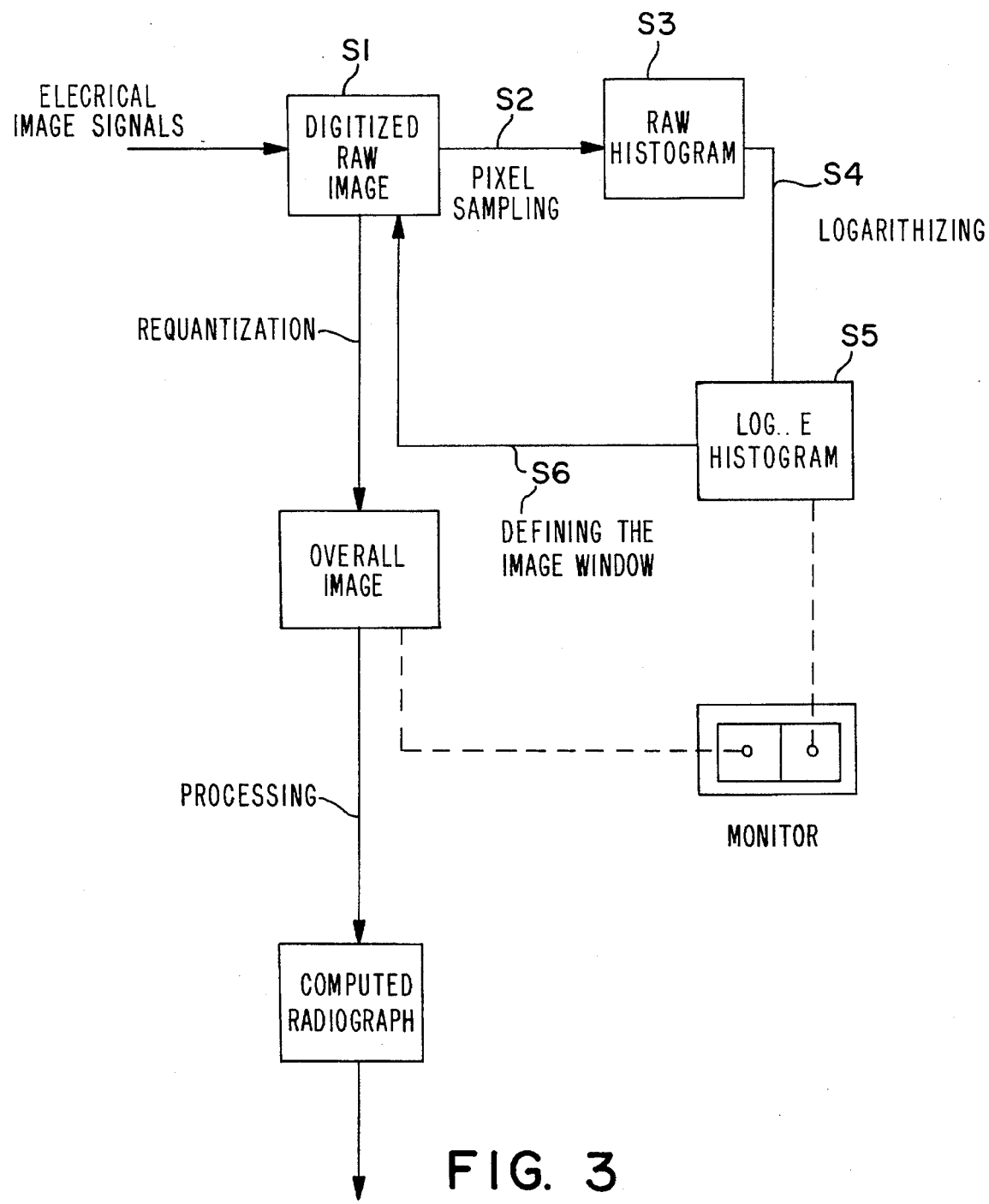
FIG. 3 is a principal overview of the image-data flow for the creation of a histogram according to the present invention.
Figure 4A:
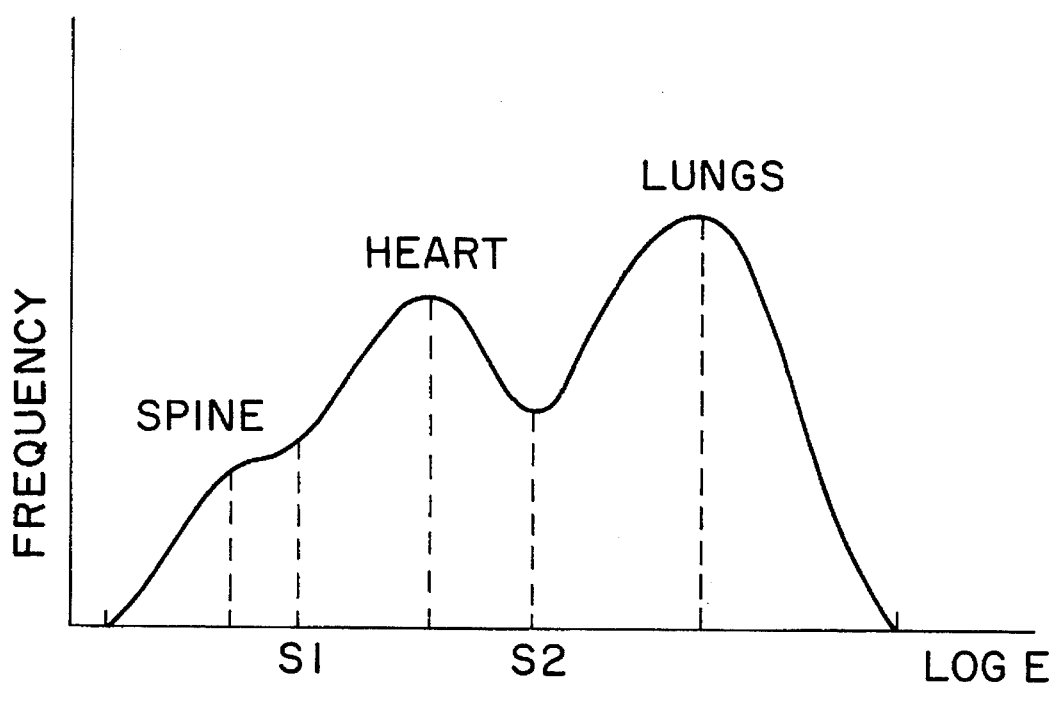
FIGS. 4a and 4b are an amplitude histogram of a chest radiation image and an amplitude histogram of the relevant image window extracted thereout.
Figure 4B:
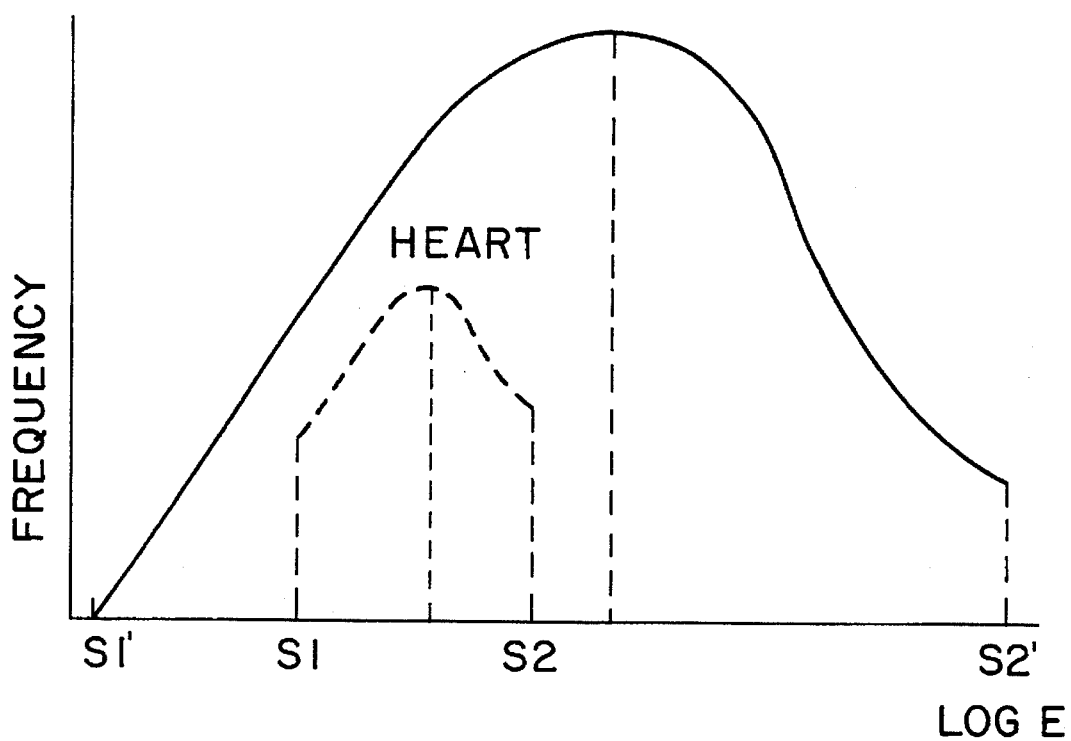

In the aforementioned requantisation, a histogram of the radiographic image signal matrix is used. FIG. 3 shows the different steps in practically realising the basic concept of the present invention. In a first step S1 all pixel values of the stimulated phosphor sheet are captured and digitised, resulting in a so-called "raw" image or raw image signal matrix. Each point of the digital image matrix is associated with a grey intensity level, which itself is a function of the light intensity emitted by the corresponding surface element. Secondly, in S2 these raw data are statistically sampled and brought into a raw histogram S3, not necessarily displayed on any viewing monitor. In step S4 these sample histogram data are transformed into suitable logarithmic densities by common methods and may be displayed as an amplitude histogram S5 on a monitor. In step S6, the diagnostically relevant range in the raw image signal matrix S1 is determined on the basis of this histogram. Said relevant image window is selected by a method shown in FIG. 4A and 4B. FIG. 4A illustrates an exemplary histogram of a chest radiation image in which can be discerned the densities respectively of the spine, the heart and the lungs, and in which signals for the area outside the patient are excluded. Indeed, the resulting histogram shows 3 peaks, the lower represents the frequencies of the spine, the central peak represents the frequency distribution of the heart and the highest peak that of the lungs. Now, the desired image signal spectrum can be selected and extracted with aid of the histogram, resulting in FIG. 4B. Accordingly, when a doctor wishes to diagnose the heart, the actual display is performed at the range or latitude corresponding to said heart.

Figure 5:
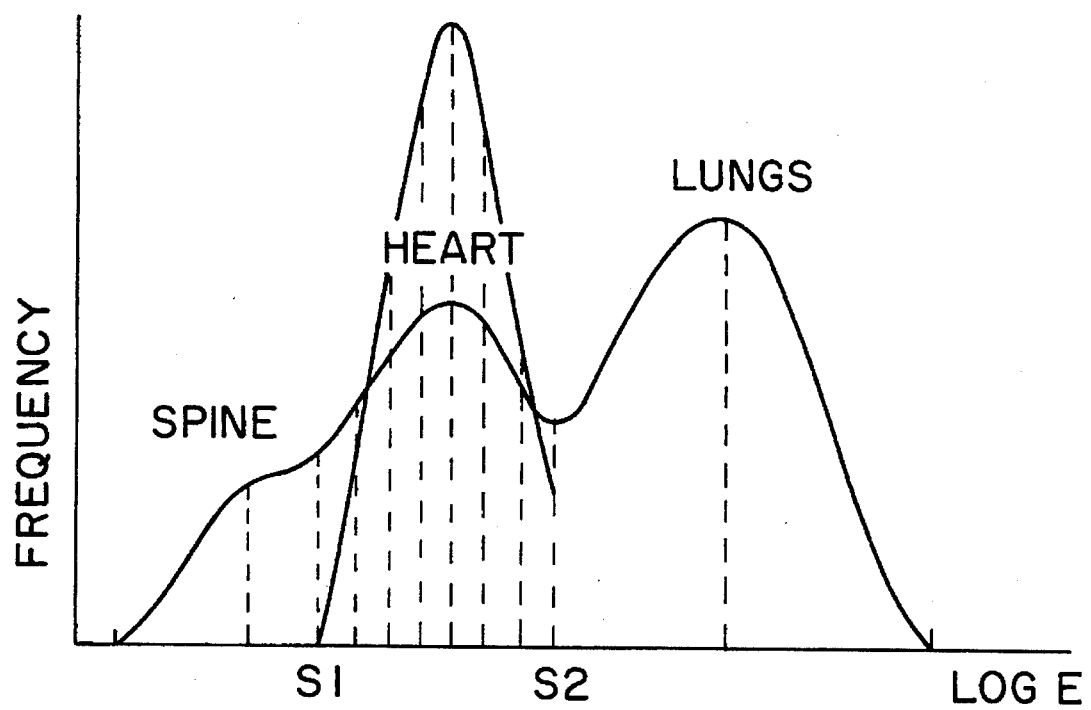
FIG. 5 shows simultaneously the total histogram of a chest radiation image together with the (amplitude-normalised) window histogram.

As shown in FIG. 5 the present invention also foresees the sequential calculation and simultaneous presentation on a display monitor of both the total histogram over the whole spectrum as described before and a specific histogram sampled to a specific window of particular interest and peak-normalised to 100%. It can be used for mapping the raw image values of the original body onto the dynamic range of the hardcopy material. This range of particular importance may be interactively adjusted by the operator in shifting a slide ruler or pushing an electronic mouse button.

The creation of the histogram based on only a part of all pixel-values present in the image matrix, according to the present invention, is described hereinafter.

Figure 6:
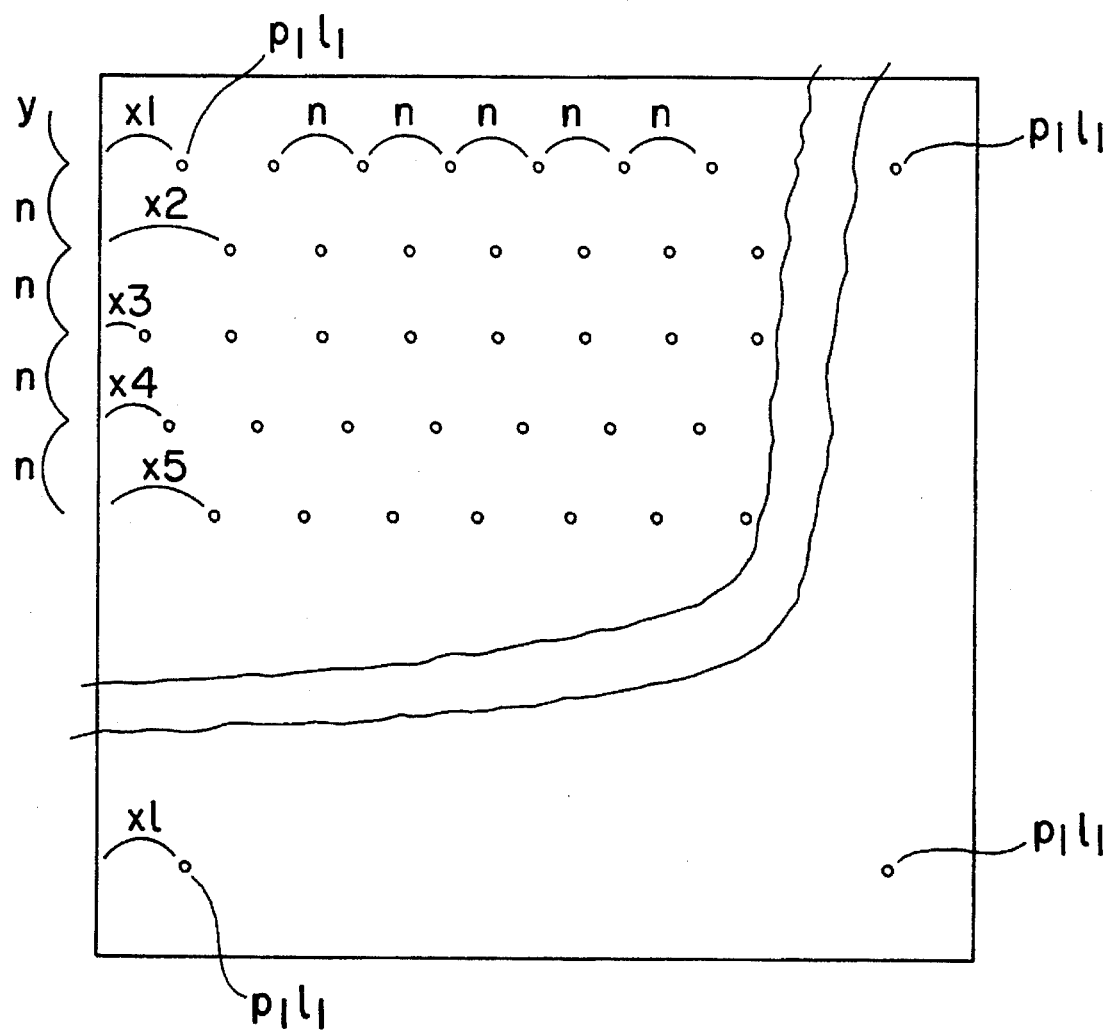
FIG. 6 is an explanatory view showing sampling points located on a phosphor sheet in order to explain how an example of statistical pixel sampling is carried out according to the present invention.

In order to avoid the undesirable consequence of sampling, namely the possible creation of spurious periodic patterns in the sampled image, we do not use the most easy 2-dimensional sampling lattice by means of a simple rectangular grid with equal spacing in both the main-scanning and subscanning directions. On the contrary, we apply for a rather irregular type of sampling lattice. For an explanatory view of such sampling grid, we refer to FIG. 6, showing sampling points located on a phosphor sheet.

Now, according to a preferred embodiment of the present invention, the statistical pixel sampling comprises the steps of:

i) -choosing a range of sample distances di in mm;

ii) -deducting from di the corresponding number of pixels ni;

iii) -choosing a value n out of ni;

iv) -generating one random number y within the ni-range;

v) -defining all sampling lines as follows (in reference to FIG. 6): first locating the initial sample-line, on which the first pixel-samples will be taken, at height y, and defining all next sample-lines by upgrading the position of the initial sample-line by increments of n;

vi) -generating a series of random numbers xj={x1, x2 . . .xl} within the same above-mentioned range ni;

vii) -sampling all pixels pj as follows (in reference to FIG. 6): first, determining the initial pixel (which will be sampled first) on each line at horizontal position x1 for the first line, x2 for the second line, etc; and then defining all next pixels on each line to be sampled by upgrading the initial pixel position xj by increments of n up to the end of each line to be sampled.

Notice that our two-dimensional sampling occurs with the aid of some random numbers, namely y for the position of the initial line to be sampled, and xj for the position of the first pixel pro sample-line.

In a specific embodiment of the present invention, the physical sample-distance di on the image plate is comprised between 1 and 3 mm.

Several photostimulable radiographic plates A,B,C,D,E and F, with different radiographic images (as knees, spines and thoraxes) at a resolution of 300 dpi were treated on a computer Sun IV-110 Workstation (a product of Sun Microsystems Inc.) by the histogram-sampling method of the invention.

The experimental designs consisted of the following steps:

-on a photostimulable radiographic plate with the quite commonly used size of 14 inch×17 inch, a raw image matrix was generated by the radiographic system, -an amplitude histogram was created, first on the basis of all pixel values, and -then on the basis of statistical sampling according to the preferred embodiment of the present invention with random number y and random numbers xj and increasing sample-distances n.

In every experiment the time to realise said histogram was measured precisely, and the resulting histograms were subjected independently to several radiologists, who had to define their best guess of the diagnostically relevant window.

As a first result of tests, it was concluded that in this process the acquisition speed of the histogram was improved impressingly by a sampling as explained in the present invention. E.g. in an ordinary case (phosphorplate with images of knees, spines or thoraxes), by building the histogram on accepting all available pixels, we measured a CPU time of about 4.7 seconds; sampling on each second pixel (n=2) reduced the CPU time to 1.5 seconds; sampling on n=3 reduced the CPU time to 0.7 s; sampling on n=12 further reduced the necessary computing time down to less as 0.01 seconds. Further, it was also proved, in a second set of experiments, that the diagnostic usefulness and reliability of such statistical sampling for constructing the histogram are kept very well, even if for reasons of economy the sampling lattice is made coarser to save on the number of sample-pixels and/or computing time. Hereto a specific computer programm was created in order to calculate and print out on hard copy the level L (or mean) of the histogram and the window W (or width or range) of the histogram under a plurality of different circumstances, namely starting from capturing each pixel, and then sampling on stepwise higher and higher fractions (n=1,2,3,4. . .). In the table hereinafter the n-values are given at which the L-result and the W-result respectively changed by at least 1/1000th Log E, which is a very ,severe evaluation. Between brackets, the n-values are given for a more realistic approach at Log E differences of about approx. 0.02 Log E. Despite the applied fractioning, the histogram based decisions proved to be very reliable.

Remark that the calculations about any shift in L or W were executed by separate and independent algorithms. Also, the visual perceptions were concluded by several and independent radiological technicians.

TABLE

|  | image-matrix | pixel-distance in mm | n-value L | W |
| --- | --- | --- | --- | --- |
| radiogr A | 2048 × 2496 | 0.17 | 16 (27) | 16 (29) |
| radiogr B | id | 0.17 | 12 (>40) | 9 (36) |
| radiogr C | id | 0.17 | 15 (19) | 31 (31) |
| radiogr D | id | 0.17 | 7 (26) | 7 (36) |
| radiogr E | 1024 × 1248 | 0.35 | 9 (15) | 20 (20) |
| radiogr F | 512 × 624 | 0.69 | 4 (10) | 10 (10) |

From these experiments it can be concluded that in normal radiographs a physical sampling distance or sample pitch of about 1 to 3 mm on the radiographic plate still guarantees a very reliable histogram for decision making about the important window; and still offers a very comfortable time-gain.

The preferred sampling-distance d depends on the inherent spatial detail available in the radiographed object.

In an alternative embodiment of the present invention, not only the horizontal pixel-sample-distances (xj), but also the vertical line-sample-distances (y) are randomnised. Such method brings some further statistical-qualitative benefits.

In another embodiment of the present invention, the main conceptual purpose is achieved by a simplified method, characterised in that the values of y and xj are no longer random numbers, but instead fixed in a value n. More precisely, the statistical pixel sampling consists in selecting each n-th pixel out of the image signal matrix, n being an integer such that the ratio of the number of pixels pro line over n does not equal an integer, in case where the image pixel matrix is stored line per line.

Alternatively, the statistical pixel sampling consists in selecting each n-th pixel out of the image signal matrix, n being an integer such that the ratio of the number of pixels pro column over n does not equal an integer, in case where the image pixel matrix is stored column per column.

Although the invention as described above relates to a method of creating a histogram of an image signal matrix based on a radiographic image system for medical diagnosis, it may also be employed in a radiation image system for industrial diagnostic applications, e.g. non-destructive testing. The present invention can be applied in various embodiments other than the description hereinabove. E.g. the phosphor plate can be a flat sheet, or a web, but it can also be flexibly drum-mounted.

The radiation image signal matrix may be recorded on a photographic film, on an electrophotographic material or on thermosensitive material, and/or it could be displayed by a cathode ray tube, or by a video recording system. The present invention aiming at creating a histogram from a radiation image signal matrix may be applied, as is set forth hereinabove, in a computed radiographic system or in a radiation image read-out and recording system with a stimulable phosphor sheet carrying a radiation image. However, the present invention can also be used for creating histograms of radiation image signal matrices generated in other ways, e.g. by scanning a radiograph made according to conventional means, and digitising the scanner data. This can also be applied to radiation image signal matrices created in e.g. computed tomographic systems or NMR systems wherein a digital image signal matrix is created. Other useful applications of the present invention may refer to other fields of image matrixes, as e.g. thermal sublimation printing, resistive ribbon printing and so on.

I claim:

1. A method of creating a histogram of an image signal matrix representative of a radiographic image having a plurality of pixels, said method comprising the steps of:
    i) scanning a stimulable phosphor sheet carrying the radiation image with stimulating rays;
    ii) detecting for each pixel the light emitted after stimulation;
    iii) converting for each pixel the detected light into electrical signals;
    iv) collecting a subset of said electrical signals by statistical sampling relative to discrete, non-clustered pixels, said statistical sampling being performed by the following steps:
        a) choosing a range of sample distances di;
        b) deducting from di a range of corresponding pixel numbers ni;
        c) choosing a value n out of ni;
        d) generating one random number y within the ni-range;
        e) defining all sampling lines as follows: locating the initial sample-line (on which the first pixel-samples will be taken) at height y, and defining all next sample-lines by upgrading the position of the initial sample-line by increments of n;
        f) generating a series of random numbers xj={x1, x2 ... xl} within the same above-mentioned range ni;
        g) sampling all pixels pj as follows: determining the initial pixel (which will be sampled first) on each line at horizontal position x1 for the first line, x2 for the second line, etc; and defining all next pixels on each line to be sampled by upgrading the initial pixel position xJ by increments of n up to the end of each line to be sampled;
    v) creating a histogram by means of said subset;
    vi) displaying said histogram on a monitor; and,
    vii) using said histogram for the determination of the relevant image window.

2. A method according to claim 1, wherein di is comprised between 1 and 3 mm.

3. A method according to claim 1, wherein the statistical pixel sampling on the basis whereof a fraction of the image pixels comprised in the image signal matrix is selected for creation of the histogram consists in selecting each n-th image pixel out of the image signal matrix, n being an integer choosen such that the ratio of the number of pixels pro line over n does not equal an integer, in case the image pixel matrix is stored line per line.

4. A method according to claim 1, wherein the statistical pixel sampling on the basis whereof a fraction of the image pixels comprised in the image signal matrix is selected for creation of the histogram consists in selecting each n-th image pixel out of the image signal matrix, n being an integer choosen such that the ratio of the number of pixels pro column over n does not equal an integer, in case the image pixel matrix is stored column per column.

5. An apparatus for creating a histogram of an image matrix representative of a radiographic image having a plurality of pixels, said apparatus comprising:
    i) means for scanning a stimulable phosphor sheet carrying the radiation image with stimulating rays;
    ii) means for detecting for each pixel the light emitted after stimulation;
    iii) means for converting for each pixel the detected light into electrical signals;
    iv) means for collecting a subset of said electrical signals by statistical sampling relative to discrete, non-clustered pixels, said collecting means including:
        a) means for choosing a range of sample distances di;
        b) means for deducting from di a range of corresponding pixel numbers ni;
        c) means for choosing a value n out of ni;
        d) means for generating one random number y within the ni-range;
        e) means for defining all sampling line by locating the initial sample-line (on which the first pixel-samples will be taken) at height y, and defining all next sample-lines by upgrading the position of the initial sample-line by increments of n;
        f) means for generating a series of random numbers xj={xi, x2 ... xl} within the same above-mentioned range ni;
        g) means for sampling all pixels pj by determining the initial pixel (which will be sampled first) on each line at horizontal position x1 for the first line, x2 for the second line, etc; and defining all next pixels on each line to be sampled by upgrading the initial pixel position xj by increments of n up to the end of each line to be sampled;
    v) means for creating a histogram from said subset; and,
    vi) means for displaying said histogram on a monitor.

* * * * *